United States Patent [19]

Mewissen

[11] Patent Number: 4,951,414
[45] Date of Patent: Aug. 28, 1990

[54] DEVICE FOR ELECTROCUTING INSECTS

[75] Inventor: Jan A. C. Mewissen, Eindhoven, Netherlands

[73] Assignee: U.S. Philips Corporation, New York, N.Y.

[21] Appl. No.: 332,681

[22] Filed: Mar. 31, 1989

[30] Foreign Application Priority Data

May 9, 1988 [NL] Netherlands ............... 8801204

[51] Int. Cl.⁵ .............................................. A01M 1/22
[52] U.S. Cl. ....................................................... 43/112
[58] Field of Search ........................... 43/112, 113, 98

[56] References Cited

U.S. PATENT DOCUMENTS

| Re. 20,298 | 3/1937 | Rovinsky | 43/112 |
| D. 154,518 | 7/1949 | Turk | 43/112 |
| 1,527,976 | 3/1925 | Haugart | 43/112 |
| 1,962,420 | 6/1934 | Bradley | 43/112 |
| 2,132,371 | 10/1938 | Kriwat | 43/112 |
| 2,674,682 | 4/1954 | Hanson | 43/112 |
| 4,853,583 | 8/1989 | Ridders et al. | |

FOREIGN PATENT DOCUMENTS 1456477 11/1976 United Kingdom .

OTHER PUBLICATIONS

"Ein Autotelefon fur Skandinavien", Funkschau, 2/1982.

Primary Examiner—Kurt Rowan
Attorney, Agent, or Firm—Brian J. Wieghaus

[57] ABSTRACT

A device for electrocuting insects having an open housing accommodating a low-pressure mercury vapor discharge lamp, a ballast electrically connected to the discharge lamp, a first and, electrically separated therefrom, a second assembly of electrically conducting wires surrounding the discharge lamp and a high-voltage generator whose output terminals are connected to a respective assembly of conducting wires. A lamp cap is secured to the housing which lamp cap has contacts which are connected to the input terminals of the high-voltage generator, to the discharge lamp and the ballast.

15 Claims, 2 Drawing Sheets

DEVICE FOR ELECTROCUTING INSECTS

BACKGROUND OF THE INVENTION

The invention relates to a device for electrocuting insects, comprising an open housing accommodating
a low-pressure mercury vapour discharge lamp having a folded discharge path,
an electric ballast electrically connected to the discharge lamp,
a first and, electrically separated therefrom, a second assembly of electrically conducting wires surrounding the discharge lamp,
a high-voltage generator having input and output terminals whose output terminals are connected to a respective assembly.

A device of the type described is known from British Patent Specification 1,456,477.

In the known device the assemblies of electrically conducting wires consist of two mutually coaxially arranged cylindrical grids of metal gauze with an air gap in between. The grids function as electrodes between which a high voltage difference is created by means of a transformer. If insects, attracted by radiation emitted by the low-pressure mercury vapour discharge lamp, move to the lamp and enter the air gap, they are electrocuted due to contact with the two grids. Investigations have shown that insects are particularly attracted by radiation in an ultraviolet range of the spectrum (320–380 nm).

A drawback of the known device is that special mechanical securing means are required to install the device. Moreover, a suitable place must always be found to suspend the device, for example to a ceiling or on a wall. The choice of the suspension location is limited because a socket must be in the vicinity of the device so as to enable it to be connected to the mains.

SUMMARY OF THE INVENTION

It is an object of the invention to provide an improved device which can be installed in a simple manner.

According to the invention this object is realized in the device of the type described in the opening paragraph in that a lamp cap having contacts is secured to the housing and in that the contacts are connected to the input terminals of the high-voltage generator and to the discharge lamp and the ballast.

The lamp cap may be an Edison screw cap or a Swan bayonet cap.

In this way it is achieved that the device according to the invention can be simply secured at any location where a lamp holder is present without special suspension facilities being required and without the presence of a socket in the vicinity of the device.

A favourable embodiment of the device according to the invention is characterized in that the housing accommodates a holder or lamp socket for the low-pressure mercury vapour discharge lamp, which discharge lamp is secured in a lamp base at the ends of its discharge path, said lamp base also incorporating a starter and having two contact pins, the lamp base cooperating with the lamp socket to connect the discharge lamp electrically and mechanically to the device.

Commercially available low-pressure mercury vapour discharge lamps with a lamp base in which the discharge lamp is secured at the ends of its discharge path and which lamp base has a built-in starter and two contact pins have a low power (11 Watts maximum). Their great advantage is that, in addition to a low power, they have small dimensions (lamp length of the order of 10 to 20 cm) and a light weight. The associated ballast is compact and relatively light weight due to the low lamp power.

In this way a very compact, light-weight device is realized, which is in great contrast to the known suspensible device with its large dimensions and heavy weight.

In a further favourable embodiment of the device according to the invention the housing has a detachable end wall at its end remote from the lamp cap. The detachable end wall provides access to the interior of the housing, notably to the discharge lamp. Preferably, the end wall is formed as a receptacle for dead insects which can therefore be removed periodically.

BRIEF DESCRIPTION OF THE DRAWINGS

An embodiment of the device according to the invention will now be described with reference to the drawings which are diagrammatic and not to scale.

In the drawings.

DETAILED DESCRIPTION OF THE PREFERRED EMBODIMENTS

Figure 1:
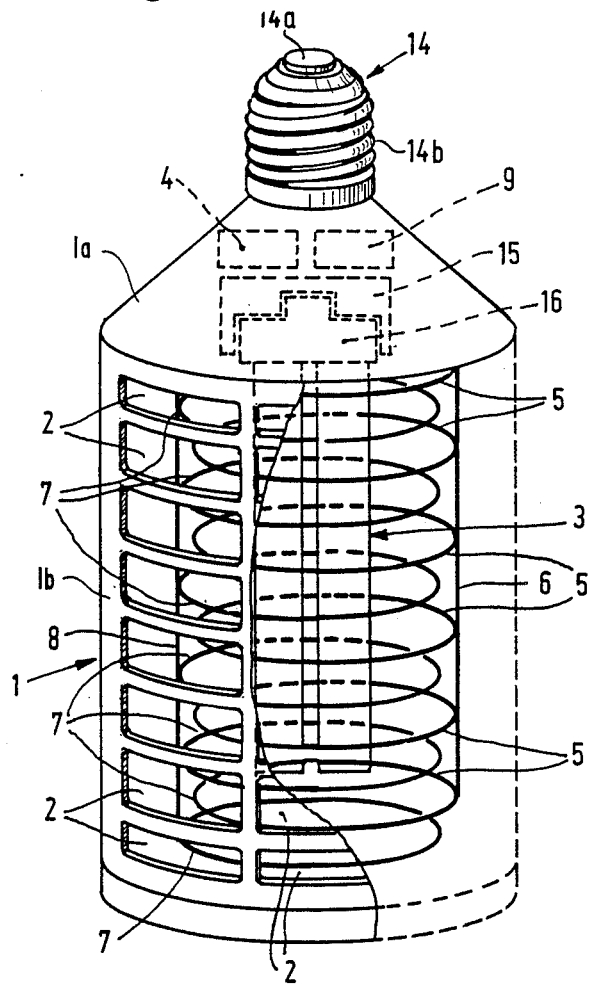
FIG. 1 is a side view of a device, partly broken away, for electrocuting insects.
Figure 2:
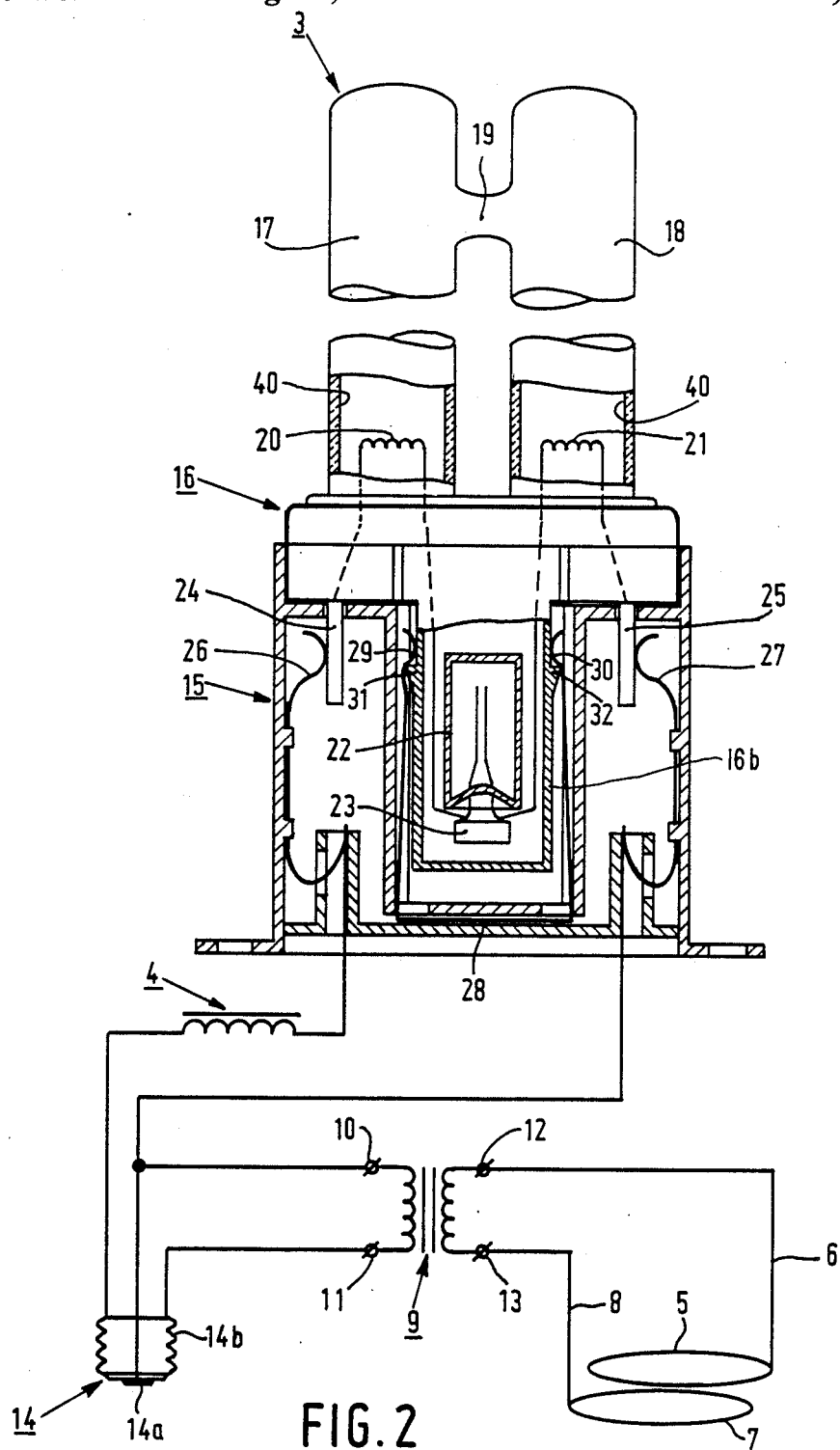
FIG. 2 is the electric circuit diagram of the device according to FIG. 1 accommodating the low-pressure mercury vapour discharge lamp of FIG. 1 in an elevational view, the connector secured to the discharge lamp of FIG. 1 in a longitudinal section and the holder cooperating with the connector of FIG. 1 in a longitudinal section.

In FIG. 1 the reference numeral 1 denotes a housing having a base portion 1a and an elongate portion 1b having openings 2 enabling insects to enter the device. A low-pressure mercury vapour discharge lamp 3 having a folded discharge path shown in the form of a U in the drawing (see FIG. 2) is arranged within the housing. An electric ballast 4 accommodated in the housing base portion 1a is electrically connected to the discharge lamp 3 (FIG. 2) in a manner to be described hereinafter. A first assembly of electrically conducting wires 5 shown as circularly bent wires in the drawing surrounds the discharge lamp 3, which wires are connected to an electric conductor 6. Furthermore, a second assembly of electrically conducting wires 7 shown as circularly bent wires in the drawing surrounds the discharge lamp 3, which wires are connected to an electric conductor 8. The wires 5 with conductor 6 are electrically separated from the wires 7 with conductor 8. In the longitudinal direction of the discharge lamp 3 the wires 5 and 7 alternate with each other. The housing 1 also accommodates a high-voltage generator 9, shown as a transformer in the drawing (see FIG. 2) which has input terminals 10 and 11 and output terminals 12 and 13. Output terminal 12 is electrically connected via conductor 6 to the first assembly of electrically conducting, circularly bent wires 5 only one of which is shown in FIG. 2. Output terminal 13 is electrically connected via conductor 8 to the second assembly of electrically conducting, circularly bent wires 7 only one of which is shown in FIG. 2.

An Edison lamp cap 14 having contacts, namely a bottom contact 14a and a side contact 14b, is secured to the housing base portion 1a. As is shown in FIG. 2, bottom contact 14a is electrically connected to the input terminal 10 of transformer 9 and, in a manner to be described hereinafter, to the discharge lamp 3. Side contact 14b is electrically connected to input terminal 11 of the transformer 9 and to the ballast 4.

In FIGS. 1 and 2 the reference numeral 15 denotes a lamp socket for the low-pressure mercury vapour discharge lamp 3. The discharge lamp 3 is secured at the ends of its discharge path in a lamp base 16 which cooperates with the socket 15 so as to connect the discharge lamp electrically and mechanically to the device. As is shown in FIG. 2, the discharge lamp 3 has two parallel discharge tube portions 17 and 18 which are connected together via a bridge 19. A phosphor 40 is present on the inner wall of 17 and 18. This may be a phosphor which emits visible radiation as well as ultraviolet radiation in the range between 320 and 380 nm. An electrode 20 is arranged at one end of tube 17 and an electrode 21 is arranged at one end of tube 18. The discharge path extends between the electrodes 20, 21. The lamp base 16 includes a tubular shell 16b which incorporates a conventional starter 22 (a gas filled glass envelope accommodating two bimetal contacts) with a capacitor 23 electrically arranged parallel thereto. The starter 22 is electrically connected to one end of the electrodes 20 and 21. The other end of electrode 20 is electrically connected to a contact pin 24 projecting from lamp base 16, whilst the other end of electrode 21 is electrically connected to a contact pin 25 projecting from 16. The contact pin 24 is in mechanical and electrical contact with a resilient metal strip 26 which is present in the socket 15 and which is electrically connected to the ballast 4. Similarly, the contact pin 25 is in mechanical and electrical contact with a resilient metal strip 27 which is electrically connected to the bottom contact 14a of the lamp cap 14. Lamp base 16 is detachably locked in holder 15 by means of a metal strip 28 with resilient ends 29 and 30 engaging projections 31 and 32 on base 16.

During operation of the device there is a high voltage difference (3,000 to 5,000 V) between the circularly bent wires 5 and 7. An insect is electrocuted when it simultaneously contacts a wire 5 and an adjacent wire 7.

Figure 3:
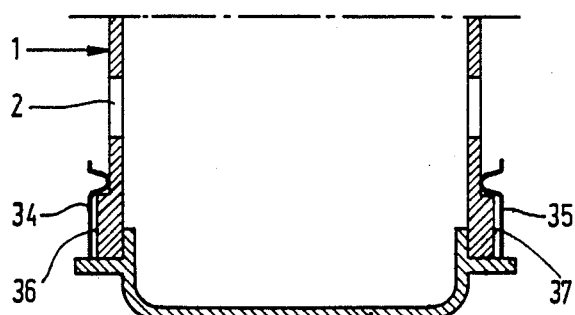
FIG. 3 shows an end portion of the housing of the device of FIG. 1 in a longitudinal section.

FIG. 3 shows the cylindrical end portion of the housing 1 of FIG. 1 which is remote from the lamp cap 14. In this Figure the housing 1 has an end wall 33 in the form of a receptacle for dead insects. The receptacle 33 is detachably locked with the housing 1 by means of clamping springs 34 and 35 engaging projections 36 and 37 on the housing 1.

What is claimed is:

1. A device for electrocuting insects, comprising:
   a compact low-pressure mercury vapor discharge lamp, said lamp comprising a sealed discharge vessel defining a folded discharge path and having a pair of adjacent sealed ends, a lamp base holding said discharge vessel at said sealed ends, a pair of discharge electrodes disposed at said sealed ends, and a pair of contact pins extending from said lamp base each electrically connected to a respective electrode;
   a housing comprising an elongate portion extending the length of said discharge vessel and an adjoining base portion, said elongate portion having a plurality of apertures, a lamp cap having first and second contacts and secured to the exterior of said base portion, said base portion comprising a lamp socket for receiving said contact pins of said lamp base, said lamp being secured in said socket;
   first and second electrically conductive wire grids surrounding said discharge vessel; and
   means for securing said wire grids in said housing such that said grids are electrically insulated from each other,
   a transformer disposed in said base portion for generating high voltage for said grids, said transformer having a pair of outputs each connected to a respective grid and a pair of inputs each connected to a respective first and second lamp cap contact; and
   a ballast disposed in said base portion for controlling lamp operating current, said ballast being connected between one of said lamp cap contacts and one of said discharge electrodes, and the other of said discharge electrodes being connected to said other lamp cap contact.

2. A device for electrocuting insects as claimed in claim 1, wherein said lamp base further comprises a tubular shell extending between said contact pins, and starter means enclosed in said shell and connected to said electrodes for starting said lamp; and
   said lamp socket in said base portion comprises a recess for receiving said shell, said shell and said recess comprising means for detachably securing said lamp in said socket.

3. A device for electrocuting insects as claimed in claim 2, wherein said means for detachably securing said lamp comprises said shell having a projection and said socket having a metallic strip with a resilient end engaging said projection.

4. A device as claimed in claim 3, characterized in that the housing has a detachable end wall at its end remote from the lamp cap.

5. A device as claimed in claim 4, characterized in that the end wall is in the form of a receptacle for dead insects.

6. A device as claimed in claim 2, characterized in that the housing has a detachable end wall at its end remote from the lamp cap.

7. A device for electrocuting insects as claimed in claim 5, wherein said discharge vessel comprises a pair of elongate parallel tube parts each have a second sealed end opposite said lamp base and a tubular bridge connecting said tube parts near said second sealed ends, a discharge being maintained during lamp operation between said electrodes through the major part of said tube parts and said bridge.

8. A device for electrocuting insects as claimed in claim 3, wherein said discharge vessel comprises a pair of elongate parallel tube parts each have a second sealed end opposite said lamp base and a tubular bridge connecting said tube parts near said second sealed ends, a discharge being maintained during lamp operation between said electrodes through the major part of said tube parts and said bridge.

9. A device for electrocuting insects as claimed in claim 2, wherein said discharge vessel comprises a pair of elongate parallel tube parts each have a second sealed end opposite said lamp base and a tubular bridge connecting said tube parts near said second sealed ends, a discharge being maintained during lamp operation between said electrodes through the major part of said tube parts and said bridge.

10. A device as claimed in claim 6, characterized in that said end wall forms a receptacle for dead insects.

11. A device for electrocuting insects as claimed in claim 10, wherein said discharge vessel comprises a pair of elongate parallel tube parts each have a second sealed end opposite said lamp base and a tubular bridge connecting said tube parts near said second sealed ends, a discharge being maintained during lamp operation between said electrodes through the major part of said tube parts and said bridge.

12. A device as claimed in claim 1, characterized in that the housing has a detachable end wall at its end remote from said lamp cap.

13. A device as claimed in claim 12, characterized in that said end wall forms a receptacle for dead insects.

14. A device for electrocuting insects as claimed in claim 13, wherein said discharge vessel comprises a pair of elongate parallel tube parts each have a second sealed end opposite said lamp base and a tubular bridge connecting said tube parts near said second sealed ends, a discharge being maintained during lamp operation between said electrodes through the major part of said tube parts and said bridge.

15. A device for electrocuting insects as claimed in claim 1, wherein said discharge vessel comprises a pair of elongate parallel tube parts each have a second sealed end opposite said lamp base and a tubular bridge connecting said tube parts near said second sealed ends, a discharge being maintained during lamp operation between said electrodes through the major part of said tube parts and said bridge.

* * * * *